I. T. GARNER.
EYEGLASS HOLDER.
APPLICATION FILED JULY 17, 1920.
1,370,806.
Patented Mar. 8, 1921.
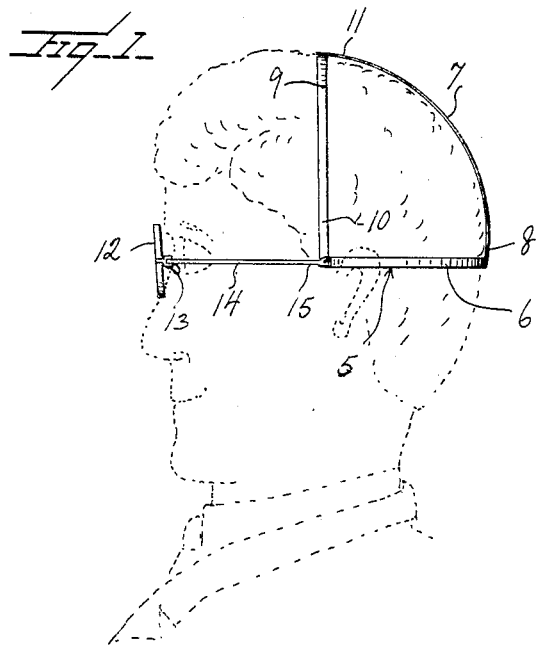
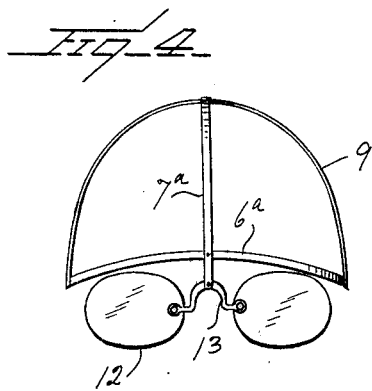
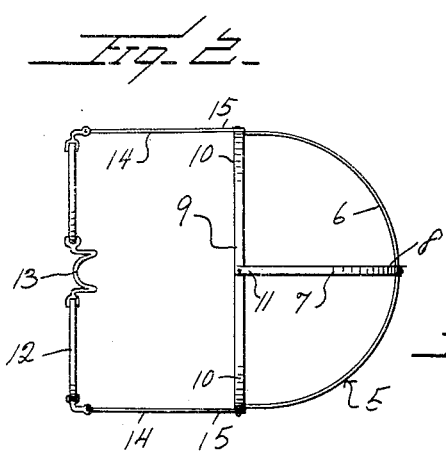
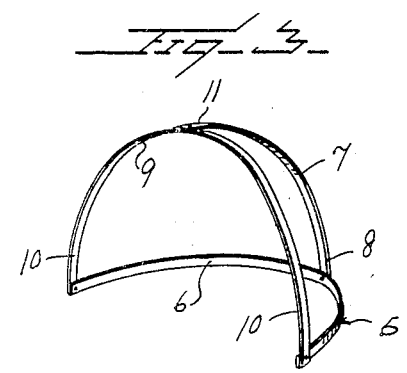
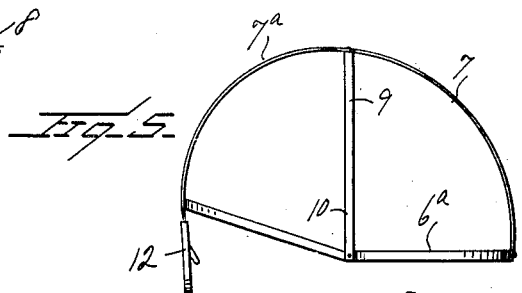
Inventor
I. T. Garner
By Watson E. Coleman
Attorney

UNITED STATES PATENT OFFICE.

ISAAC T. GARNER, OF CALERA, ALABAMA.

EYEGLASS-HOLDER.

1,370,806. Specification of Letters Patent. Patented Mar. 8, 1921.

Application filed July 17, 1920. Serial No. 397,016.

*To all whom it may concern:*

Be it known that I, ISAAC T. GARNER, a citizen of the United States, residing at Calera, in the county of Shelby and State of Alabama, have invented certain new and useful Improvements in Eyeglass-Holders, of which the following is a specification, reference being had to the accompanying drawings.

This invention relates to eye glass holders and has for its object to provide a holder of this character which permits the eye glasses to be properly positioned before the eyes without the irritation, soreness and like discomfort caused by the temple pieces of the holders engaging the ears and side of the head.

Another object is to provide a holder of this character which permits the glasses to be raised above the eyes and properly positioned without requiring the holder to be removed from the head of the person.

A still further object of the invention is to provide a holder of this character wherein the temple pieces may be removed entirely and glasses supported by the nose piece without requiring the nose piece to pinch the bridge of the nose.

With the above and other objects in view, the invention consists in the improved construction and arrangement of parts to be hereinafter more particularly described, fully claimed and illustrated in the accompanying drawings, in which:—

Figure 1 is a side elevation of an eye glass holder constructed in accordance with an embodiment of the invention, Fig. 2 is a top plan view of the structure shown in Fig. 1, Fig. 3 is a perspective view of the holder, Fig. 4 is a vertical elevation of a modified form of holder, and Fig. 5 is a side elevation of the structure shown in Fig. 4.

Referring to the drawings, 5 designates the eye glass holder in its entirety, said holder being constructed in semi-helmet form and comprising a base band 6 which extends around the head of the user and terminates at the temples. A band 7, is secured at its ends 8 to the rear portion of the band 6. This band extends upwardly over the head and terminates at the top of the head. The band 9 is secured at its ends 10 to the side portions of the band 6, the end 11 of the band 7 being secured to the intermediate portion of the band 10, thereby forming a semi-helmet.

An eye glass frame 12, is provided and includes the usual nose piece 13 adapted to rest upon the nose without pinching the same. The frame 12 is also provided with temple pieces 14 having the ear engaging portions removed. The ends 15 of the temple pieces are connected to the ends of the band 6. It is of course obvious that the bands 6, 7 and 9 are arranged to suit the size of the head of the user, and in view of their novel arrangements support the eye glasses before the eyes of the user without causing irritation by frictional or firm engagement of the nose piece and temple pieces with the nose and head of the user.

In Fig. 4, I have shown a modified form of holder. This holder is similar in construction to the holder above mentioned with the exception that the base band 6ᵃ extends entirely around the head of the user, and the band 7 is provided with an extension 7ᵃ and extended from the intermediate portion of the band 9 over the forehead of the user and connected to the nose piece 13. In this form of holder, the temple pieces 14 are removed and the forward portion of the band 6ᵃ connected to the ends of the extensions 7ᵃ and the nose piece 13 thereby properly supporting the glasses in a comfortable position without the use of temple pieces or a pinching nose piece.

This holder may be constructed of any desired material and in various sizes to accommodate the head of the user. When once applied, it is impossible for the glasses to be knocked, or otherwise accidentally removed from the eyes of the user. At the same time, the wearer is not conscious of the fact that he is wearing glasses, as the uncomfortable feeling of temple pieces and pinching nose piece is eliminated so that the holder is not only comfortable to the user but prevents unnecessary expense by protecting the eye glasses from damage.

What is claimed is:—

1. An eye glass holder comprising a frame adapted to engage the rear and top portions of the head of a person, an eye glass frame, and temple pieces pivoted to the eye glass frame, and the helmet frame.

2. An eye glass holder comprising a semi-helmet frame including a base band, a side and top band connected at its ends to the ends of the base band, a rear and top band connected at one of its ends to the base band and at the opposite end to the side and top band, an eye glass frame, and temple pieces pivotally connecting the eye glass frame to the end portions of the side and top, and base bands.

In testimony whereof I hereunto affix my signature.

ISAAC T. GARNER.